R. OKRASSA.
COFFEE HULLER AND POLISHER.
APPLICATION FILED AUG. 10, 1911.
1,035,631.
Patented Aug. 13, 1912.
2 SHEETS—SHEET 1.
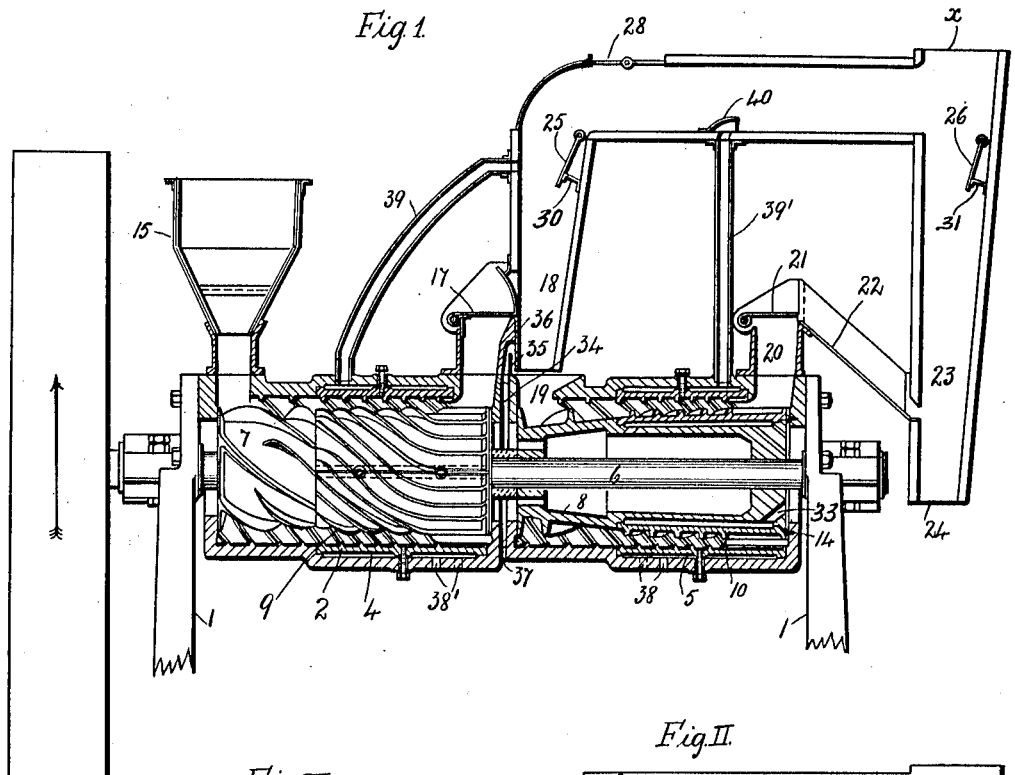
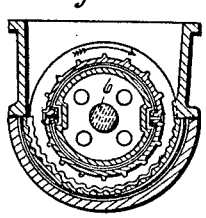
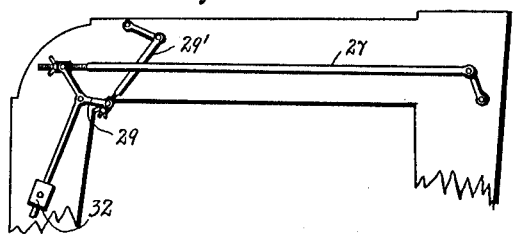
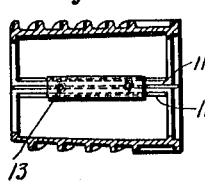
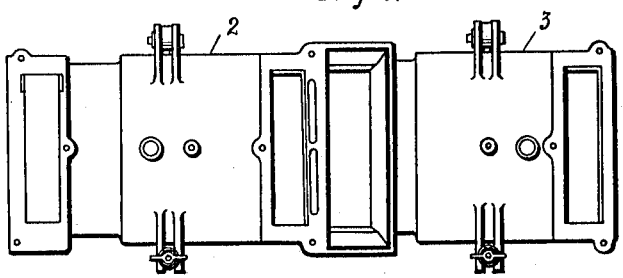

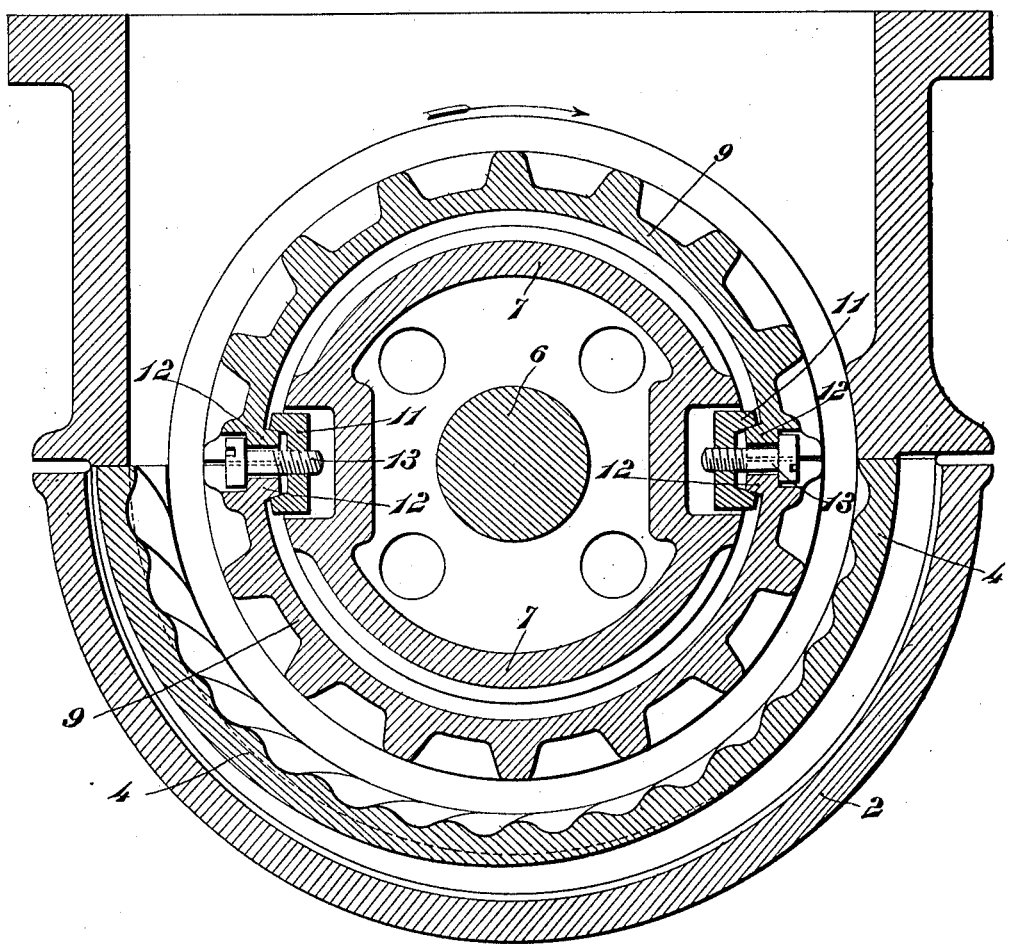

UNITED STATES PATENT OFFICE.

ROBERTO OKRASSA, OF ANTIGUA, GUATEMALA.

COFFEE HULLER AND POLISHER.

1,035,631. Specification of Letters Patent. Patented Aug. 13, 1912.

Application filed August 10, 1911. Serial No. 643,345.

*To all whom it may concern:*

Be it known that I, ROBERTO OKRASSA, a subject of the German Emperor and King of Prussia, and residing at Antigua, Guatemala, Central America, have invented certain new and useful Improvements in Coffee Hullers and Polishers, of which the following is a specification.

This invention relates to an improved coffee huller and polisher for coffee in the shell of the kind constructed of a pair of alined externally ribbed cylinders rotating within internally ribbed cylindrical casings each of which has a connection at one end with a conduit through which loose shell and dust are withdrawn by means of an air current.

The primary object of the present invention is to provide for automatic regulation of the current of air which carries the skins, etc., which is especially important where the machine is driven by water-wheel, turbine or other motive power involving irregular velocity.

Other objects will appear from the following description.

The invention is illustrated in the accompanying drawings in which—

Figure I is a part vertical section and part side elevation of the complete machine with the connections for withdrawing shell, etc. Fig. II is a detail view of the devices for controlling the air draft. Fig. III is a transverse section showing one of the rotary cylinders and its surrounding casing. Fig. IV is a plan showing the casings. Fig. V is a longitudinal section of the rotary cylinder shown in Fig. III. Fig. VI is an enlarged sectional view, similar to Fig. III, to more clearly illustrate the parts.

Referring to the drawings, mounted on standards 1 are two stationary alined cylindrical casings 2 and 3 made in halves. The casings 2 and 3 are ribbed internally, as shown, and fitted with renewable liners 4 and 5 also made in halves and formed with ribs and removed slightly from the walls of the casings so as to leave air spaces. As shown, each liner extends to the delivery end of the casing, and at the delivery end the lower half of the liner is eccentrically shaped so as to allow the skins to be more easily freed from the coffee.

Fitted on a revolving shaft 6 disposed co-axially of the casings are two hollow rotary cylinders or cones 7 and 8 one within each casing. The rotary cylinders 7 and 8 are ribbed externally and are also fitted with ribbed sleeves 9 and 10, the latter being made in halves and held together by internal clamps 11 fitted on inwardly extending flanges 12 on the said halves and tightened up by means of inwardly extending screws 13. As shown, the ribs are partly helical and partly straight, the angling of the ribs being such as to insure the maximum of efficiency.

Fitted within each casing at its delivery end is a renewable ring 14 which takes up wear on the casing end.

At the inlet end of the casing 2 is a hopper 15 into which is placed the coffee to be hulled and polished. At the delivery end of the said casing is a funnel 16 fitted with a hinged door 17 controlling communication between the funnel 16 and an air conduit 18 forming a branch of a system of air piping. The inlet to the casing 3 is shown at 19; being in close proximity to the lower end of the conduit 18. At the delivery end of the casing 3 is a funnel 20 having a hinged door 21 controlling communication with a chute 22 leading to the air conduit 23 forming a second branch of the said system of air piping. It will therefore be understood that when coffee is put into the hopper and the shaft 6 revolved, the coffee is hulled in the casing 2 by the action of the ribs and is also fed forwardly by the helical ribs on the cylinder 7; the coffee and shells being forced up the funnel 16 and through the door 17 into the air conduit 18 where the air (exhausted at $x$) carries away the loose pieces of shell, the coffee passing into the casing 3 by way of the inlet 19 and being caused to travel along the casing 3, up the funnel 20 and into the air conduit 23, where by the action of the air draft it is separated from the remaining loose pieces of shell and dust and discharged quite clean at 24.

In this improved machine the air conduits 18 and 23 are provided with check valves or doors 25 and 26, for regulating the passage of air currents through the same, and the connecting passageway between the said conduits is provided with a suction-reducing butterfly valve 28 for regulating the inlet of air through an opening leading into said passageway from the outside. These conduits 18 and 23 and the connecting passageway between them provide a system of air suction pipes through which the particles of shells or other debris are carried away from the hulling and polishing chamber or chambers within the casing of the machine. Connected with the stem or pivot of the valve 25 is a three-armed lever 29 the longer or depending arm of which is provided with a counterbalancing weight 32. One of the shorter arms of the lever 29 is connected with an arm for operating the valve 26 by means of a link 27, while the other shorter arm of the said lever 29 is connected by a link 29' with an arm for operating the suction-reducing butterfly valve 28. It will thus be seen that all of the said valves are connected together and are controlled by the counterbalance or weighted lever 29, so as to maintain a proper equilibrium such as will insure an automatic regulation of the air currents which carry the shells or other debris from the hulling chamber or chambers, so that the suction or draft will be uniform notwithstanding that the machine or the suction fan may be running at different rates of speed; and thus any danger that the heavier coffee beans may be sucked out of the hulling and polishing chamber or chambers and be discharged at the exhaust passage $x$ with the shells or debris, will be avoided. The check valves or doors 25 and 26 are maintained in proper positions, partly opened, by means of rests 30 and 31. When a normal or a desired air current is established in the piping comprising the air conduits 18 and 23 and the passageway between said conduits and leading thence to the exhaust outlet $x$, the valves 25, 26 and 28 will be maintained, by the counterbalance or weighted lever 29 in the positions denoted in Fig. 1; but should a stronger current than is desirable, be induced, by an increased suction due to increased speed in a suction or exhaust fan the upwardly moving air currents in the conduits 18 and 23 will tend to partially close the valves 25 and 26, and such closing movement of the said valves will cause the suction-reducing valve 28 to be opened more or less, and thus the entire closing of the check valves will be prevented and the air currents will be automatically regulated to maintain a desired or normal draft or suction.

In order to cool the parts exposed to heavy work—which is necessary for the production of clean, polished and unblemished coffee—cold air is admitted by way of apertures 33, being allowed to pass in the direction of the arrows between the sleeve 10 and the hollow cylinder 8, into the interior of the cylinder 8, thence through the space 34, over and under baffle plates 35 and 36 serving to prevent coffee from entering the interior of the cylinder, and into the air conduit 18; orifices 37 assisting in the ventilation. The liners 4 and 5 are cooled by a current of air which enters by apertures 38, 38$^1$ (Fig. I) passes around the casings and up through tubes 39, 39$^1$ into the air conduits—a protecting shield being fitted at 40 to prevent the shells from falling into the tube 39$^1$.

What I claim is:—

1. In a machine of the character described, the combination with a suitable casing in which the coffee is hulled and polished, of a system of air suction pipes comprising a conduit communicating with the chamber or chambers of said casing, one or more check valves and a suction-reducing valve for regulating the passage of air through the said pipes, means for connecting said valves together, and a counterbalance connected with said valves and normally maintaining them in desired positions; whereby a closing movement of the said check valve or valves, due to increased suction in said pipes, will impart an opening movement to the said suction-reducing valve, and vice versa, so as to provide for an automatic regulation of the air currents.

2. In a machine of the character described, the combination with a casing, of a hollow rotary cone or cylinder, within said casing, a liner within and spaced apart from said casing to form an air chamber, a sleeve surrounding but spaced apart from the said hollow cone or cylinder forming an air chamber outside of and communicating with the interior of the said hollow cone or cylinder, and a system of air suction and separating pipes communicating with the chamber in which said cylinder works, as also with the air chamber between the said liner and casing and with the interior of the said hollow cone or cylinder, the latter being provided with air inlet passages; whereby cool air may be drawn through the air chambers between the said casing and liner and between the said sleeve and the said hollow cone or cylinder and be partly exhausted from the interior of the latter, thereby providing for an efficient cooling of the hulling and polishing devices; and whereby also the shells and debris may be separated from the polished product.

In testimony whereof I have signed my name to this specification in the presence of two subscribing witnesses.

ROBERTO OKRASSA.

Witnesses:
 AUGUSTA SCHAROCH,
 M. BOISSIERE.